Figure 1:
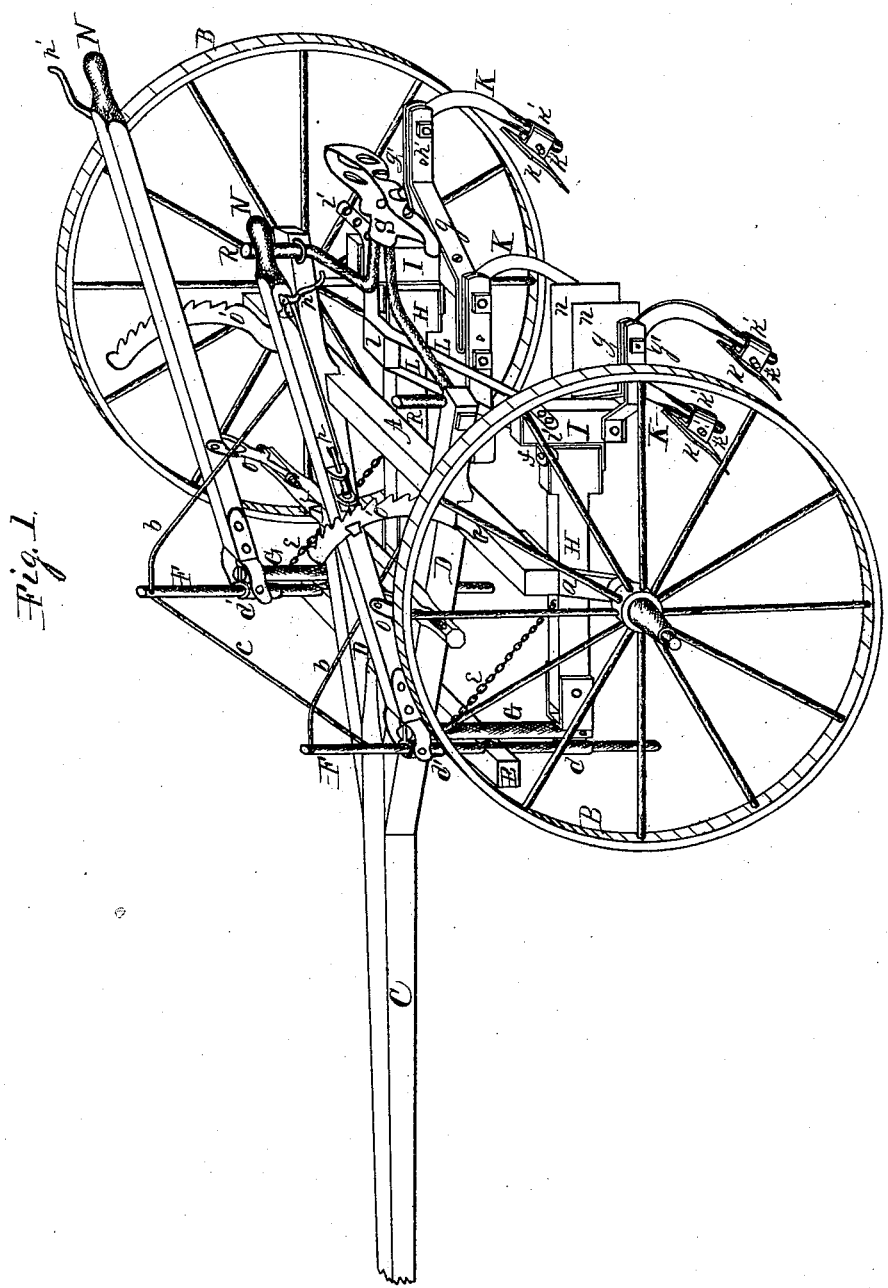

2 Sheets—Sheet 1.

C. NASH.
Cultivator.

No. 208,921.  Patented Oct. 15, 1878.

Attest,
A. O. Behel
Israel Sovereign

Inventor,
Chester Nash.
Per Jacob Behel
Atty.

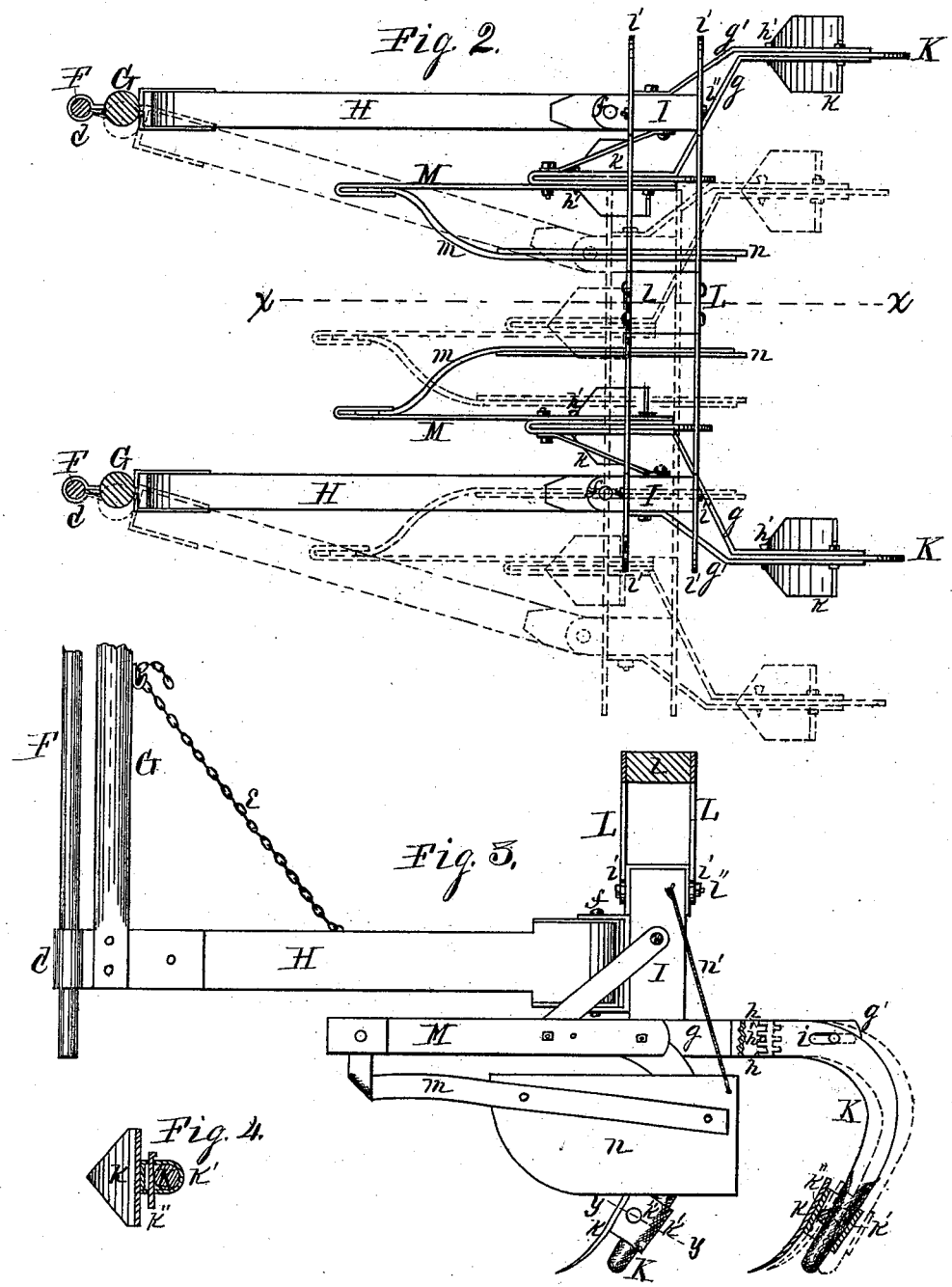
C. NASH.
Cultivator.
No. 208,921. Patented Oct. 15, 1878.

UNITED STATES PATENT OFFICE.

CHESTER NASH, OF DAVIS JUNCTION, ILLINOIS.

IMPROVEMENT IN CULTIVATORS.

Specification forming part of Letters Patent No. 208,921, dated October 15, 1878; application filed August 17, 1878.

*To all whom it may concern:*

Be it known that I, CHESTER NASH, of Davis Junction, in the county of Ogle and State of Illinois, have invented a new and useful Improvement in Cultivators, of which the following is a specification:

This invention relates to that class of cultivators known as "sulky" or "riding" cultivators, designed to cultivate both sides of a row of plants at the same time.

The object of this invention is to produce a cultivator in which the shovels, in their lateral movements to conform to the sinuosities of the rows of plants, shall be in a horizontal plane or planes substantially parallel to the axle of the machine, and that the relative working depth of the shovels on each independent drag-bar shall remain unchanged by their vertical adjustment, and that in the lateral movement of the shovels their working-face shall maintain their relative angle with the line of draft. These and other improvements, which will be hereinafter described, constitute the subject-matter of this invention.

In the drawings, Figure 1 is an isometrical representation of a cultivator embodying my invention. Fig. 2 is a plan view of the drag-bars and the parts thereto connected, of which Fig. 3 is an elevation of the inside of one of the drag-bars and of the parts connected thereto, taken on dotted line $x$. Fig. 4 is a transverse section of the shovel and its fastening on dotted line $y$.

In the figures, A represents an axle-tree, to the outer ends of which are fixed the bent axle-arms $a$, fitted to receive the carrying-wheels B, which are fitted to revolve thereon.

C represents the tongue, which is of the usual form. To the sides of its rear portion are fixed the diverging beams D, which extend rearward of the axle-tree, and are firmly fixed thereto toward its outer ends. E is a transverse beam, fixed to the under side of the tongue C and the diverging beams D, rearward of their junctional point, and about on line with the forward periphery of the carrying-wheels. These parts constitute the main carrying-frame of the machine.

F are slideways, in this instance made of tubular material, as of gas-pipe, and are centrally fixed to the outer ends of the transverse bar E in a vertical position, and are held rigid by means of lengthwise braces $b$ and transverse braces $c$, connecting the upper ends of the slideways with the main frame. $d$ and $d'$ are slide-loops, fitted to move freely up and down on the slideways, and also are adapted to turn thereon. These slides are applied one above and the other below the transverse bar E, and are connected by the vertical bars G, the ends of which are rigidly fixed to the slide-loops, connected in such a manner as to form a single slide capable of an up-and-down movement on the vertical slideways. The lower slide-loops, $d$, are provided with rearward extensions, which receive the forward ends of the drag-bars H, which are pivoted therein by means of a bolt or rivet, which is passed transversely through the rear extensions of the slide-loops $d$ and through the drag-bars, and secured in such a manner as to permit the rear end of the drag-bars to rise on their pivotal connection with the slides. $e$ are suspension-chains, the lower ends of which are fixed to the drag-bars rearward of their hinged connection with the slide-loops $d$, and their upper ends are hooked to the upper portion of the connecting-bars G in such a manner that they may be lengthened or shortened by hooking in different links, by which the rear ends of the drag-bars may be held at different angles relatively with the vertical connecting-bars G.

By means of this arrangement it will be seen that if the slide-loops $d$ and $d'$, with the connecting-bars G, are moved up and down on the slideways F, the drag-bars H thereto attached will be carried with the movement of the slides, maintaining their horizontal position, both ends moving in unison; but, by means of their chain-connection with the connecting-bar G, the rear ends of the drag-bars can rise independent of the upward movement of their forward ends. This permits the wheels to drop into low places without affecting the running depth of the plows.

The shovel-carrying frames are made separate from the drag-bars, and of suitable form to receive the shovel-standards to carry the shovels one in advance of the other, and placed to produce separate parallel furrows at proper intervals, and are adapted to be pivoted to the rear ends of the drag-bars. In this instance these frames are made in the peculiar form represented in the drawing, in which I are vertical post-like portions, provided with ears, which project from their forward edges, adapted to embrace the rear ends of the drag-bars, to which they are connected by vertical pivot-bolts $f$, which pass through the ears and through the rear ends of the drag-bars, forming a pivot-joint connection.

$g$ are bars, of suitable material and of proper size, bent in the form represented, and, in connection with the bars $g'$, are firmly bolted to the lower ends of the vertical post-like portions. The space formed between the forward portion of the bar $g$ and the return overlapping portion thereof receives the upper portion of the forward shovel-standard, and the space formed between the overlapping rear portions of the bars $g$ and $g'$ receive the upper portion of the rear shovel-standard.

K are shovel-standards, curved as represented, having their upper forward ends fitted with a series of notches, $h$, adapted to receive a wooden break-pin, $h'$. The rear curved portions of the shovel-standards are slotted lengthwise, as at $i$. These shovel-standards are placed between the overlapping portions of the forward ends of the bent bars $g$ and between the rear overlapping portions of the bars $g$ and $g'$ in such a manner that the notches $h$ in their forward ends shall engage the break-pins $h'$, which have been previously passed through the bars in holes provided for their reception; and the standards are held in position between the bars by sufficient screw-bolts passed through the bars and through the slots $i$ in the shovel-standards. These slots $i$ permit the shovel-standards to be moved backward to free their notched ends from the break-pins, for the purpose of changing the pitch of the standards, which is accomplished by slackening the screw-bolt that holds the standard in place, and then sliding the standard rearward to disengage its notched end from the break-pin, which can then be raised or lowered in position to receive the pin in a different notch. It is then moved forward to engage the pin, in which position it is made fast by tightening the screw-bolt. This arrangement furnishes a ready method of changing the pitch of the shovels attached to the lower ends of the standards to cause them to enter the ground at a proper angle, and the same devices serve to prevent breaking the shovels when meeting with rigid obstructions, in which instance the pin $h'$ will be broken and permit the shovel with the standard to swing back and pass the obstruction without injury to the parts, which can then be returned to their proper position and a new pin inserted.

$k$ are shovels, fitted with a back socket, $k'$, to receive the lower end of the shovel-standard. These sockets are fitted with transverse holes in front of the standard to receive a key, $k''$, which, when driven in, will force the standard against the rear side of the socket and hold the shovel in position on the standard.

By this arrangement the shovels may be adjusted vertically on the standards to regulate their relative working depth, and can be turned on the standards to either side to throw the furrows to or from the plants.

L is a sway-bar, composed of two like arching bars, having placed between their center portions a block, $l$, to which they are firmly bolted. These bars have a portion of their lower and outer ends, at $l'$, bent to form a horizontal foot, adapted to embrace the forward and rear edges of the vertical post-like portions I, and are fitted with a series of holes lengthwise of the foot portions to receive suitable bolts $l''$, by means of which they are pivoted to the posts in such a manner that the drag-bars on the separate sides of the machine can move vertically independent of each other, and that the posts to which the sway-bar is pivoted shall be held parallel to each other; that, in the lateral movements of the drag-bars, the shovel-frames of which the posts I are a part shall maintain their parallel positions relatively with the line of draft; and that the distance of the lateral movements of all the shovels shall be substantially the same; and that in all their lateral movements the faces of the shovels shall maintain their positions relatively with the line of draft; and by means of the connection of the drag-bar carrying the shovel-frames with the vertical slides G by chain-connection, in the manner described and shown, the horizontal movements of the shovels will be in a plane substantially parallel with the axle-tree.

By means of the series of holes in the horizontal foot portions of the sway-bar, the shovel-frames and the drag-bars to which they are pivoted are made adjustable laterally, for the purpose of plowing closer to or farther from the plants.

M are shield-supports, of bar form, bolted to the inner sides of the shovel-frames, and extend forward, and are fitted at their forward ends to receive the upturned ends of the shield-bars $m$, which are pivoted therein to play up and down freely.

$n$ are shield-plates, fixed to the rear portions of the shield-bars $m$ in such position as to hang between the forward shovels on cords or chains $n'$, connecting them with the shovel-frame, and are employed to protect the plants when small from being injured or covered by the loose earth thrown by the shovels. These shields, as will be seen, are connected to the shovel-frame, and are controlled by the movements thereof, but, being flexible, are not compelled to conform strictly to all the rigid movements of the drag-bars, and vertically they are free to move independent of each other and of the movements of the drag-bars, to permit them to slide over clods and high places, and are limited in their downward movements by the chains or cords $n'$.

N are hand-levers, pivoted at their forward ends, by trunnion-connection with a sliding collar on the slideway F, between two portions of the upper slide-loops, $d'$. These levers are supported some distance from their forward ends on pivoted connections in fulcrums $o$, hinged to a transverse bar, $N'$, fixed to the diverging beams D, and extend rearward of the axle in convenient reach of the driver when in his seat on the rear of the machine.

$o'$ are segment-formed saw-toothed ratchets, in this instance pivoted to the axle-tree, and are received in guideways fixed to the side of the hand-levers in such a manner as to permit the lever to move up and down freely. These levers are provided with a spring-bolt, $p$, adapted to engage the teeth of the ratchet, and are operated to disengage them from the ratchet-teeth by means of finger-levers $p'$, attached to the handle end of the levers, connected to the spring-bolts by suitable connecting-rods. By means of these levers and their connection with the shovel-frames, the driver seated on the machine is enabled to regulate the working depth of the plows, and to raise and hold the plows suspended for transportation.

By this construction and arrangement of the parts the up-and-down movements of the forward and rear shovels of each independent frame will be in unison and substantially the same.

R represents a seat-supporting frame, made of suitable bar-iron, bent in the form represented, forming a central rearward extension, and lateral projecting arms, provided with upturned ends, which meet the inner faces of the rear extensions of the diverging beams D, to which they are held and made vertically adjustable by means of screw-eyebolts, the eyes of which receive the upturned ends of the seat-frame, and their screw-threaded shanks are passed through the beams, and are provided with screw-nuts, by means of which the seat-frame is clamped and held to the frame in a vertically-adjustable manner, to raise and lower the seat supported on its rear extension, for the purpose of adapting the machine to the use of operators differing in size, to enable them to reach the shovel-frame with their feet to move the shovels laterally to conform to the sinuosities of the rows of plants without being placed in a cramped or overstrained position.

S represents the operator's seat, supported on the rear extension of the seat-frame, and is made adjustable lengthwise thereon, for the purpose of balancing the machine when used by light or heavy operators.

I claim as my invention—

1. The combination, with the main frame of a cultivator and slideways arrranged to project above and below the main frame in front of the axle, of drag-bars, each having a slide secured to its forward end, said slides provided with bearings or sleeves which surround the slideways at points above and below the cultivator-frame, substantially as set forth.

2. The combination, with stationary slideways attached to the main frame of a cultivator, and arranged to project above and below the main frame, of drag-bars, each having a slide secured to its forward end, said slides provided with bearings or sleeves which surround the upper and lower portions of the slideways and are adapted to be vertically adjusted thereon, and hand-levers attached to the upper ends of the slides and arranged to raise and lower the same, substantially as set forth.

3. The combination, with the main frame of a cultivator provided with slideways located in advance of the axle and arranged to project above and below the main frame, of flexible connections having their opposite ends respectively attached to the slides and drag-bars, substantially as set forth.

4. The combination, with the drag-bars of a cultivator, of shovel-frames pivoted to the rear ends thereof, and connected by a pivotal sway-bar, whereby the shovel-frames are adapted to have independent vertical movement and a lateral movement in unison with each other, substantially as set forth.

5. The combination, with the drag-bars and shovel-frames pivoted thereto, of a sway-bar, to the opposite ends of which the shovel-frames are adapted to be pivoted in a laterally-adjustable manner, substantially as set forth.

6. The combination, with the drag-bars and shovel-frames pivoted thereto, of a sway-bar composed of two transverse bars, between the opposite ends of which are pivoted the upper ends of the shovel-frames, substantially as set forth.

CHESTER NASH.

Witnesses:
A. O. BEHEL,
JAMES FERGUSON.